(12) United States Patent
Wilkinson et al.

(10) Patent No.: US 11,438,432 B2
(45) Date of Patent: Sep. 6, 2022

(54) CONTROL OF CACHE DATA

(71) Applicant: Metaswitch Networks Ltd, Enfield (GB)

(72) Inventors: Jim Wilkinson, Edinburgh (GB); Jonathan Lawn, Nazeing (GB)

(73) Assignee: METASWITCH NETWORKS LTD, Enfield (GB)

( * ) Notice: Subject to any disclaimer, the term of this patent is extended or adjusted under 35 U.S.C. 154(b) by 0 days.

(21) Appl. No.: 17/341,270

(22) Filed: Jun. 7, 2021

(65) Prior Publication Data
US 2021/0365373 A1 Nov. 25, 2021

Related U.S. Application Data

(63) Continuation of application No. 15/243,825, filed on Aug. 22, 2016, now abandoned.

(30) Foreign Application Priority Data

Aug. 27, 2015 (GB) .................................... 1515237

(51) Int. Cl.
*H04L 67/568* (2022.01)
*G06F 12/0804* (2016.01)
*G06F 12/0868* (2016.01)

(52) U.S. Cl.
CPC ...... *H04L 67/2842* (2013.01); *G06F 12/0804* (2013.01); *G06F 12/0868* (2013.01); *G06F 2212/466* (2013.01)

(58) Field of Classification Search
CPC ............. G06F 12/0804; G06F 12/0802; G06F 12/0868; G06F 2212/466; H04L 67/2842
See application file for complete search history.

(56) References Cited

U.S. PATENT DOCUMENTS

2008/0114930 A1* 5/2008 Sanvido .............. G06F 12/0866
711/113

OTHER PUBLICATIONS

GB1515237.4—Certificate of Grant, dated Mar. 17, 2021, 4 pages.

* cited by examiner

*Primary Examiner* — William E. Baughman
*Assistant Examiner* — Janice M. Girouard
(74) *Attorney, Agent, or Firm* — Newport IP, LLC; Han K. Gim

(57) ABSTRACT

A machine-implemented method for controlling transfer of at least one data item from a data cache component, in communication with storage using at least one relatively higher-latency path and at least one relatively lower-latency path, comprises: receiving metadata defining at least a first characteristic of data selected for inspection; responsive to the metadata, seeking a match between said at least first characteristic and a second characteristic of at least one of a plurality of data items in the data cache component; selecting said at least one of the plurality of data items where the at least one of the plurality of data items has the second characteristic matching the first characteristic; and passing the selected one of the plurality of data items from the data cache component using the relatively lower-latency path.

17 Claims, 4 Drawing Sheets

CONTROL OF CACHE DATA

CROSS-REFERENCE TO RELATED APPLICATIONS

This application claims the benefit of U.S. patent application Ser. No. 15/243,825, filed on Aug. 22, 2016 and entitled "Control of Cache Data," which claims the benefit of United Kingdom Patent Application No. GB1515237.4, filed on Aug. 27, 2015 and entitled "Control of a Cache Data," which is hereby incorporated by reference herein.

FIELD OF THE INVENTION

The present invention relates to the control of cached data, and more particularly to modifying the process of transfer of selected data from a cache to storage according to data inspection criteria.

BACKGROUND

The scalability of many applications is limited by how fast they can write to permanent storage. They therefore implement a "write-cache" using a faster storage medium which is placed before the permanent storage in the write process. This allows the writes to permanent storage to be performed as efficiently as possible, the cost being some latency before the write is complete, thus facing those of skill in the art with the problem of tuning the cache to manage the trade-off between latency and efficiency.

Often, the purpose of the cache is to smooth out uneven write request rates and data item sizes, and possibly to manipulate the requests so that they can be tailored for maximum write efficiency given the characteristics of the permanent storage. It may also avoid writes that are quickly overwritten. The cache mechanism may also be used to allow the data to be structured to improve read or search performance. For example, it may be used to group records appropriately, to aggregate data in time order or to provide extended information in the records that are eventually written from the cache.

However, the latency introduced by the cache can cause problems. For instance, if any part of the system is likely to fail, it increases the chance that data will not reach the permanent storage. The latency will also mean that on an active system the data on the permanent storage is not up-to-date, or is only partially present. This can be limiting if one of the purposes of the system is to provide real-time or near-real-time inspection of the data (as well as archiving for later inspection or batch processing).

SUMMARY OF THE INVENTION

According to a first aspect, there is provided a machine-implemented method for controlling transfer of at least one data item from a data cache component in communication with storage using at least one relatively higher-latency path and at least one relatively lower-latency path, the method comprising: receiving metadata defining at least a first characteristic of data selected for inspection; responsive to the metadata, seeking a match between said at least first characteristic and a second characteristic of at least one of a plurality of data items in the data cache component; selecting said at least one of the plurality of data items where the at least one of the plurality of data items has the second characteristic matching the first characteristic; and passing the selected one of the plurality of data items from the data cache component using the relatively lower-latency path.

In a second aspect, there is provided an apparatus for controlling transfer of at least one data item from a data cache component in communication with storage using at least one relatively higher-latency path and at least one relatively lower-latency path, the apparatus comprising: a receiver component operable to receive metadata defining at least a first characteristic of data selected for inspection; a seeker component operable to respond to the metadata by seeking a match between the at least first characteristic and a second characteristic of at least one of a plurality of data items in the data cache component; a selector component operable to select the at least one of the plurality of data items where the at least one of the plurality of data items has the second characteristic matching the first characteristic; and a communications component operable to pass the selected one of the plurality of data items from the data cache component using the relatively lower-latency path.

There may further be provided a computer program product stored on a non-transient storage medium and comprising computer-readable code for controlling transfer of at least one data item from a data cache component in communication with storage using at least one relatively higher-latency path and at least one relatively lower-latency path, the computer-readable code comprising computer program code elements for receiving metadata defining at least a first characteristic of data selected for inspection; responsive to the metadata, seeking a match between the at least first characteristic and a second characteristic of at least one of a plurality of data items in the data cache component; selecting the at least one of the plurality of data items where the at least one of the plurality of data items has the second characteristic matching the first characteristic; and passing the selected one of the plurality of data items using the relatively lower-latency path.

BRIEF DESCRIPTION OF THE DRAWINGS

An embodiment of the invention will now be described, by way of example only, with reference to the appended drawings, in which.

DETAILED DESCRIPTION

Figure 1:
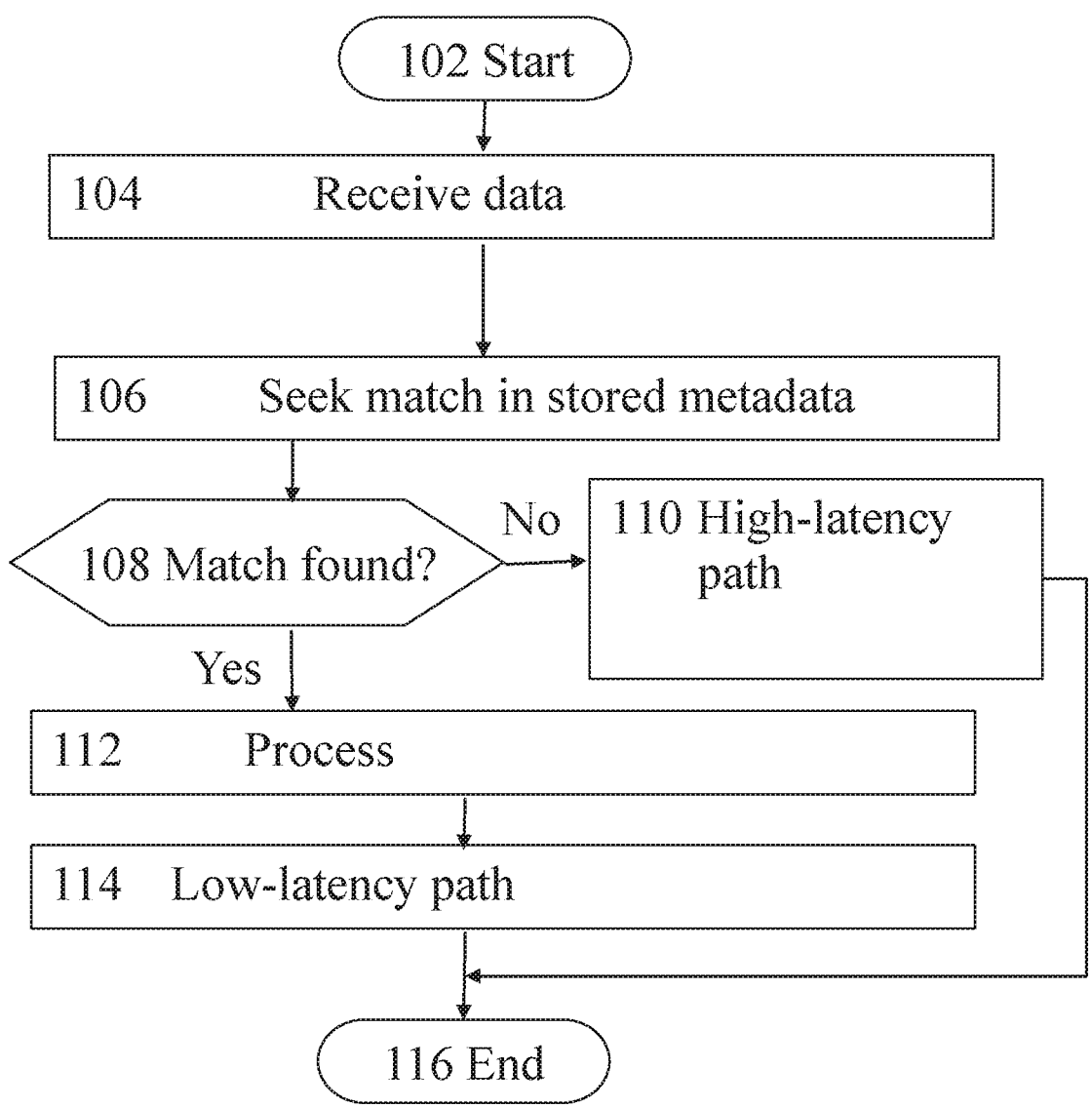
FIG. 1 shows one part of an exemplary method for the control of cached data.
Figure 2:
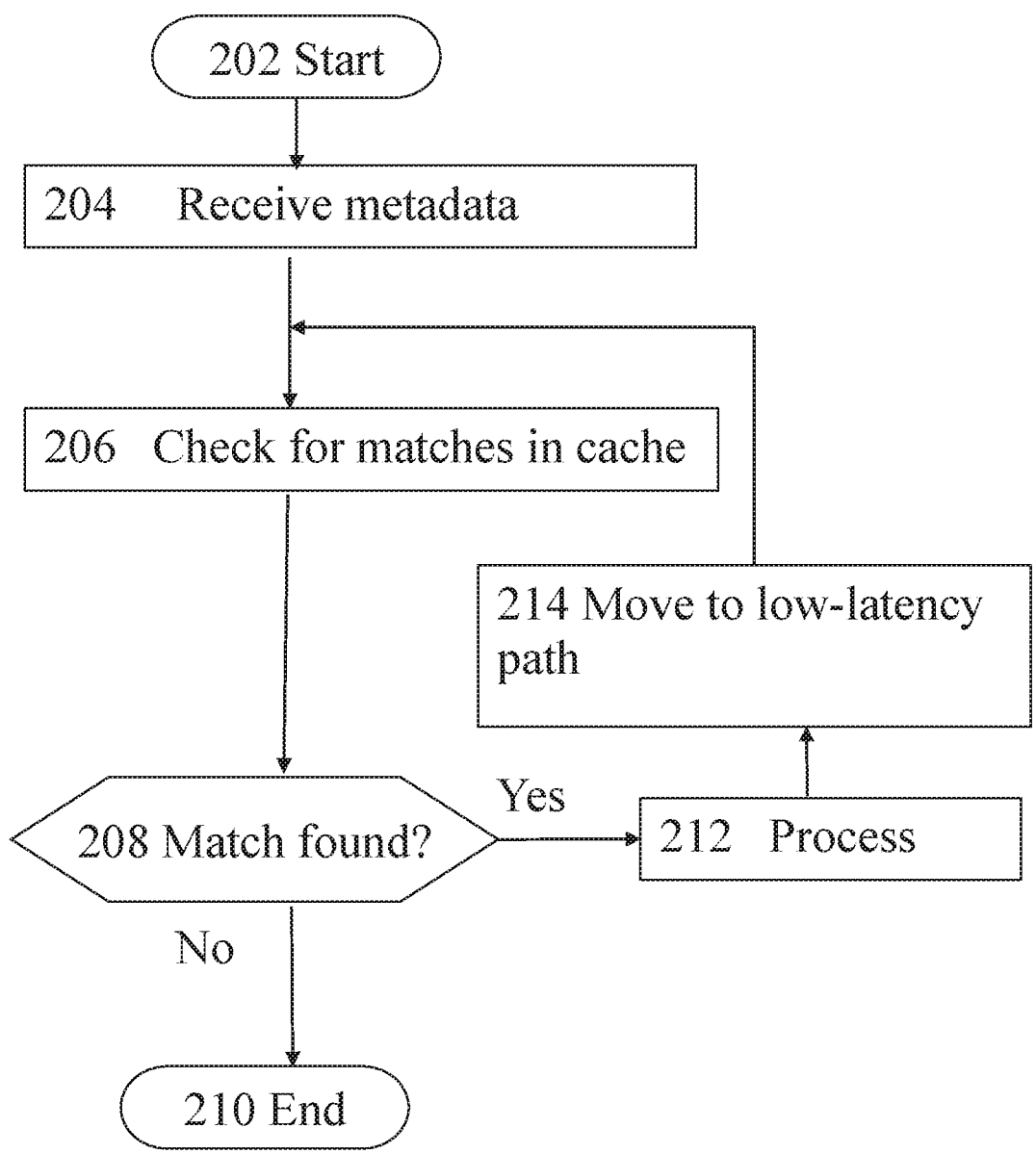
FIG. 2 shows a further part of an exemplary method for the control of cached data.

In FIGS. 1 and 2 are shown parts of a machine-implemented method 100, 200 for controlling transfer of at least one data item from a data cache component in communication with storage using at least one relatively higher-latency path and at least one relatively lower-latency path. It will be clear to one of ordinary skill in the art that "data cache component" is merely a convenient exemplary descriptive term and that the term may also encompass such variants as a spool, a buffer or a queue, each of which represents a more or less temporary or transient data structure for managing the flow of data from an emitter to a consumer, such as a permanent storage arrangement. The consumer storage arrangement may also vary, in that it may itself be a temporary structure, such as an in-memory database or the like. In one further embodiment, the consumer storage may be an inspectable portion of the cache itself. In a different embodiment, the consumer storage may be a further cache having a higher flush speed than the original cache. It will be also clear to one of ordinary skill in the art that the word "path" as used here is not intended restrictively. Thus, the higher-latency and lower-latency path mechanism may be achieved simply by prioritising items selected for lower-latency handling, while the overall bandwidth of the paths is fixed.

The method 100 commences at Start step 102, and at step 104 data is received. At step 106, a match is sought in stored metadata defining at least a first characteristic of data selected for inspection. The metadata may comprise, in an example, stored search criteria from at least one of a current search and a prior search.

Responsive to the receipt of the data, at step 108 a match is sought between the characteristic in the stored metadata and a characteristic of at least one of the data items in transit from the data cache component. If, at test step 108, no match is found, at step 110, the data item may be passed from the cache via a "normal", higher-latency path at step 110 and the process ends at End step 116. However, if at test step 108, a match is found, the data item is selected for passing via a lower-latency path at step 114 and the process ends at End step 116. In one embodiment, when a match is found at test step 108, the stream containing the matching data item may be marked for passing to the storage via the lower-latency path. Thus is addressed the common situation where the data consists of a multiplicity of distinct streams, each of which has been aggregated for archiving on permanent storage, but where any small subset of the streams may be required for human inspection with as little latency as possible.

Optionally, the data item or the data items in the stream may be further processed at process step 112 before being passed at step 114. For example, the data may be tagged for ease of retrieval from the storage in a subsequent inspection process. In a further optional refinement, the data item may be duplicated by a copier component, so that the duplicate may be passed via the lower-latency path while an original remains in the cache.

In FIG. 2, there is shown a further part of the method 100, 200. The process begins at Start step 202 and at step 204 metadata is received. At step 206, a match is sought in the cache for data matching the metadata defining at least a first characteristic of data to be selected for inspection.

Responsive to the receipt of the metadata, at step 208 a match is sought between the characteristic in the received metadata and a characteristic of at least one of the data items in transit from the data cache component. If, at test step 208, no match is found, at step 210, process ends at End step 210. However, if at test step 208, a match is found, the data item is selected for passing via a lower-latency path at step 214 and the process returns to check for further matches in the cache at step 206.

Optionally, the data item or the data items in the stream may be further processed at process step 212 before being passed at step 214. For example, the data may be tagged for ease of retrieval from the storage in a subsequent inspection process. In a further optional refinement, the data item may be duplicated by a copier component, so that the duplicate may be passed via the lower-latency path while an original remains in the cache.

The embodied method thus provides a mechanism to allow the inspection processing to selectively influence the caching behaviour, so that the data of interest reaches the inspectable storage with significantly reduced delay. In one embodiment, extensions to a data retrieval language, such as SQL, may be used to allow a client to indicate which data should be selected for flushing from the cache, or the cache component itself may be operable proactively to monitor recent searches performed on data in the inspectable storage, and to fast-flush matching data items from the cache, possibly by predicting future "items of interest" based on past performance. In a further variant, the cache component may select streams of data items that contain unexpected error log information for the fast-flush mechanism.

Figure 3:
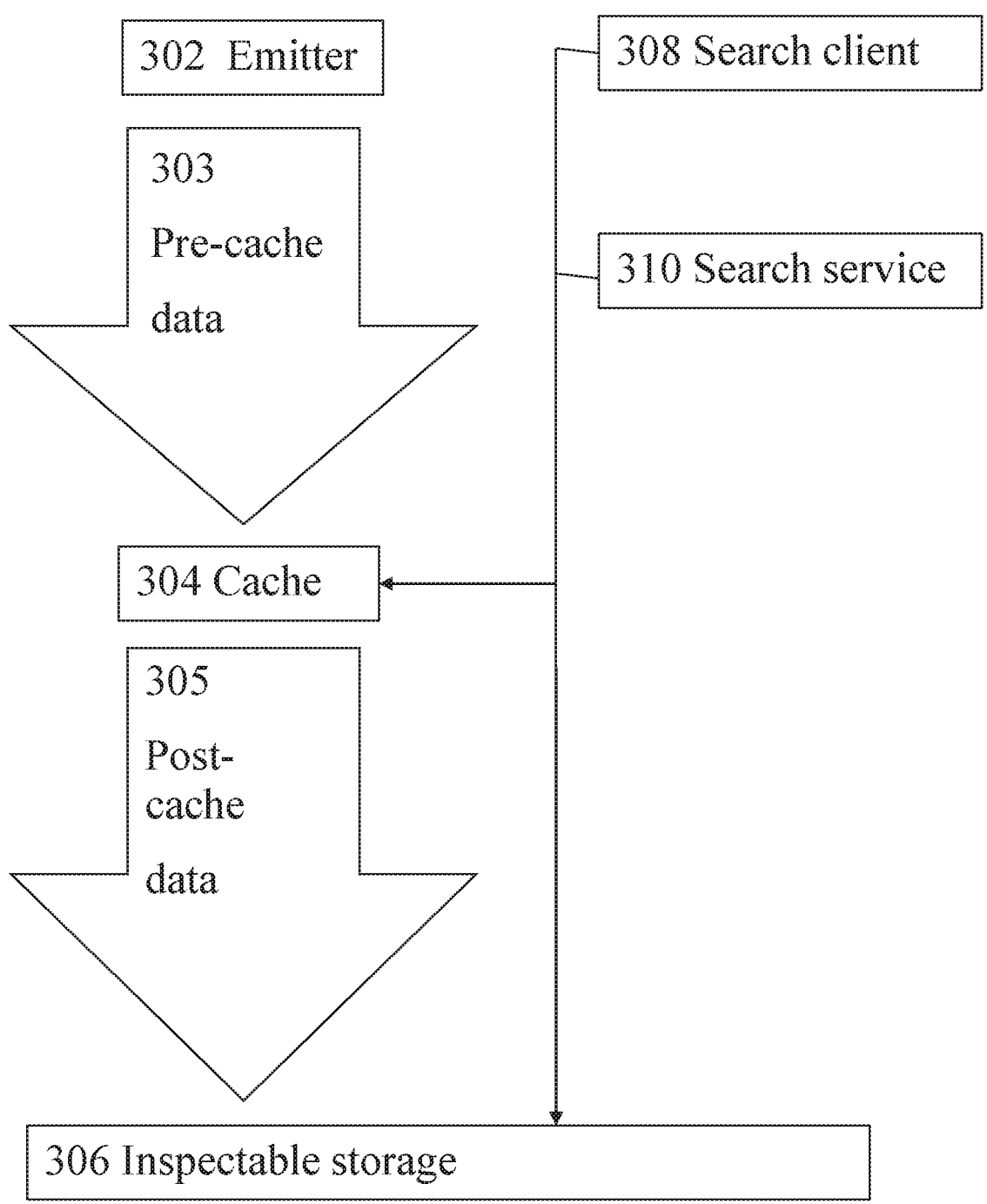
FIG. 3 shows an example of data flows from emitters to storage.

The data flow 300 shown in FIG. 3 of the appended drawings illustrates an embodiment in which one or more emitters 302 are generating a flow 303 of pre-cache data, possibly comprising one or more streams, as described above. Flow 303 enters cache 304 and is transferred onward to, for example, inspectable storage 306 as a flow of post-cache data 305 as a result of a cache flush, a fetch operation or the like. Before the flow from emitter 302 to inspectable storage 306, metadata from search client 308 or search service 310 is used to select data in the cache to be routed via the appropriate path—lower-latency if a data item in the flow matches the search criteria for a current or prior search, and higher-latency if no such match is found.

This allows the actual search to proceed against the inspectable storage as normal, in the same way it would without the new mechanism, but with significantly decreased latency. For example, when the data consists of streams, this technique can indicate to the cache that a particular subset of streams should be written to inspectable storage faster than normal. Because only a small proportion of the data is being selected for this form of caching, overall write efficiently is not significantly affected.

In a refinement of the disclosed technique, the embodied method can be readily extended to include multiple data sources, caches, post-cache processors, permanent or temporary storage devices and inspection apparatus and methods. In the case of post-cache processor involvement, the embodiment may take into account any delay caused by such processing, as well as the write latency of the inspectable storage. The output of this post-cache processing might be inspected directly, without any specific permanent storage element being present. For instance, processor intensive tasks like encryption or low-bandwidth communications can also create a queue of work where a cache might advantageously be deployed, and where benefits might be derived from allowing a reader to expedite certain data that it is waiting for using the disclosed technique or apparatus operable to perform the technique.

Figure 4:
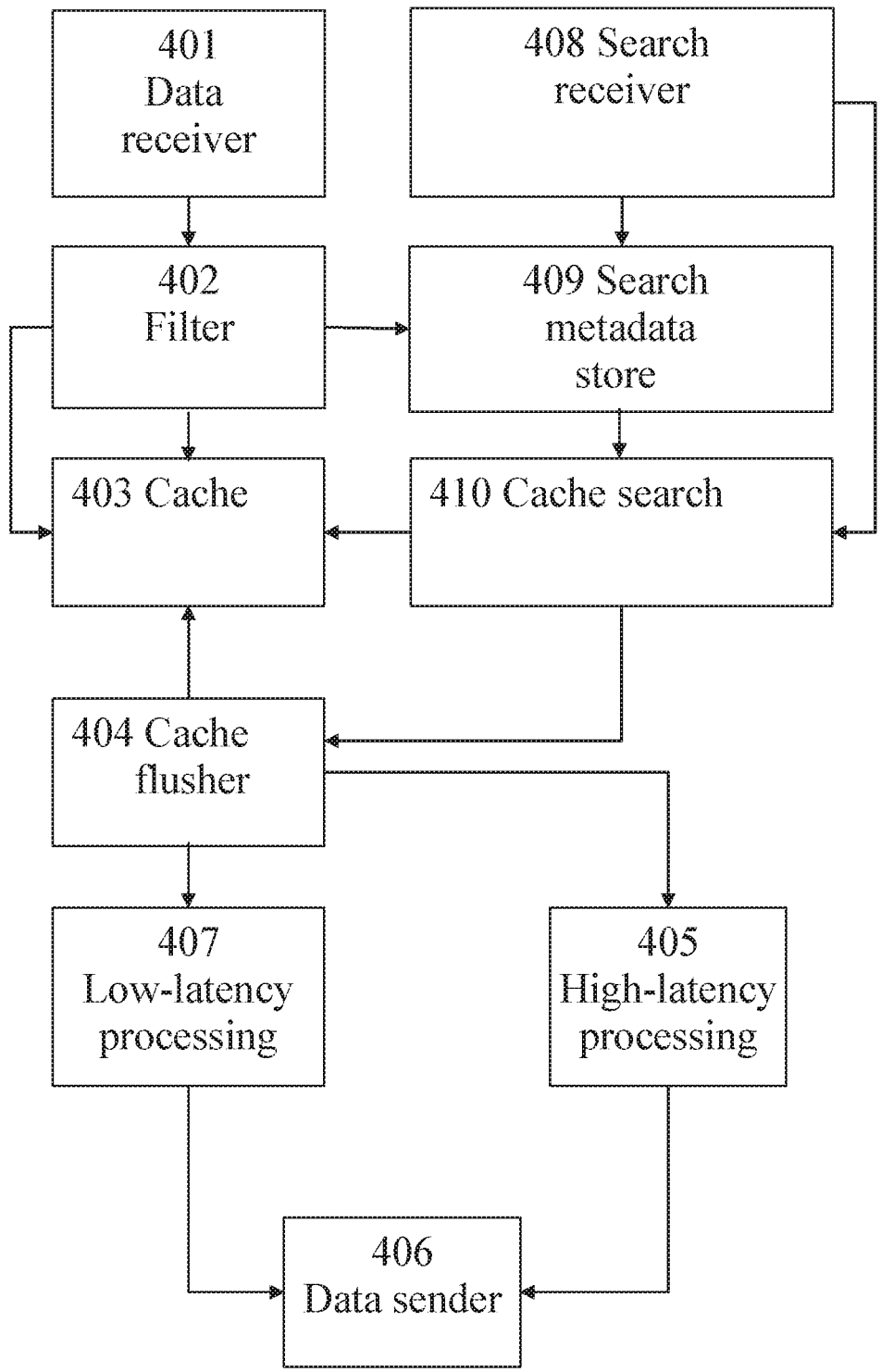
FIG. 4 shows an exemplary apparatus operable to control cached data.

Turning now to FIG. 4 of the appended drawings, there is shown a cache component 400 for controlling transfer by a data sender component 406 of at least one data item from a data cache 403 using at least one relatively higher-latency path 405 and at least one relatively lower-latency path 407. Cache component 400 comprises a data receiver 401 that is operable to pass data on to filter 402. Filter 402 is operable in connection with search metadata store component 409 and cache search component 410 to locate selected data items in cache 403. Cache component 400 further comprises a search receiver component 408 that is operable to receive current or past search criteria, which are in turn used to provide metadata relating to data items in the cache 403. Cache search component 410 is operable in conjunction with cache flusher 404 to selectively flush items from the cache 403 via either high-latency processing 405 or low-latency processing 407.

Optionally, the data item or data items in the cached data may be tagged for ease of retrieval from the storage in a subsequent inspection process. In a further optional refinement the data item may be duplicated by a copier component, so that the duplicate may be passed via the lower-latency path while an original remains in the cache.

As will be clear to one of ordinary skill in the art, the presently disclosed technique is of wide applicability. One example is that of the gathering and use of diagnostic information from sessions between telecommunications clients, such sessions representing primarily telephone calls. Diagnostics from millions of calls per day from multiple servers must be stored for a number of weeks, necessitating large disk arrays. However, operators may want to inspect diagnostics from a few calls in real-time.

The diagnostics servers split the incoming diagnostics into a separate cache for each session, and normally flush this cache on a timer that detects a gap since the last data for the session was received.

Application of an embodiment of the present technique adds a mechanism whereby the search presentation layer stores the search terms that clients are currently inspecting. These terms are used to determine the appropriate sessions currently in the cache, and also future sessions as they start using the cache. The sessions identified are flushed to disk very quickly, so that the disk provides up-to-date information. The presentation layer is also notified of any new sessions by the cache, to prevent the need for polling for them.

Other applications of the disclosed technique include (but are not limited to) the provision of analytics with a live display of a subset of the data, such as system or network "health" or commercial performance metrics, such as database transaction costing. Further applications include human-determined analytics queries, such as system or network troubleshooting, customer analytics during customer care calls and interception and analytics instigated by law-enforcement or governance control agencies. Where the present technique is applied in the area of knowledge-based systems, there is scope for application of machine-determined diagnostic operations, such as automatic issue spotting, diagnostics collection and troubleshooting, firewalling of computer systems with automatic blacklists, and analysis relating to fraud detection.

As will be appreciated by one skilled in the art, aspects of the present technology may be embodied as a system, method or computer program product. Accordingly, aspects of the present technology may take the form of an entirely hardware embodiment, an entirely software embodiment, or an embodiment combining software and hardware aspects.

Furthermore, aspects of the present technology may take the form of a computer program product embodied in a transient or non-transient computer readable medium having computer readable program code embodied thereon. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

Computer program code for carrying out operations for aspects of the present technology may be written in any combination of one or more programming languages, including object oriented programming languages and conventional procedural programming languages. The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present technology may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present technology may be realized in the form of a computer implemented method of deploying a service comprising steps of deploying computer program code operable to, when deployed into a computer infrastructure or network and executed thereon, cause said computer system or network to perform all the steps of the method.

In a further alternative, the preferred embodiment of the present technology may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present invention.

What is claimed is:

1. A machine-implemented method for controlling transfer of at least one data item from a data cache component communicatively coupled to storage via a first path and a second path, wherein the first path has a higher latency than the second path, the method comprising:
   receiving search terms from at least one of a current search or a prior search, the search terms indicative of diagnostics topics that were searched in a telecommunications network, the search terms usable to identify data items stored in the data cache component that are associated with the diagnostics topics;
   responsive to receiving the search terms, identifying a matching data item based on a match between the search terms and one of the data items stored in the data cache component; and
   in response to identifying the matching data item, sending the matching data item from the data cache component to the storage using the second path.

2. The machine-implemented method as claimed in claim 1, wherein said sending comprises making a duplicate of said matching data item and sending said duplicate while leaving an original of said matching data item in said data cache component.

3. The machine-implemented method as claimed in claim 1, wherein said sending comprises sending the matching data item to permanent storage.

4. The machine-implemented method as claimed in claim 1, wherein said sending comprises sending the matching data item to at least one of inspectable permanent storage, an inspectable portion of said data cache component, a low-bandwidth communications channel, or a post-cache processor.

5. The machine-implemented method as claimed in claim 1, further comprising sending at least one unselected data item of the data items to inspectable storage using the first path.

6. The machine-implemented method as claimed in claim 1, further comprising sending said matching data item to a further data cache component having a higher flush speed than a data cache component used for at least one unselected data item of the data items.

7. The machine-implemented method as claimed in claim 1, wherein the data items are divided into a plurality of streams, wherein:
said identifying comprises identifying a stream of the plurality of streams; and wherein said sending comprises sending a plurality of data items from the identified stream.

8. The machine-implemented method as claimed in claim 1, further comprising tagging said matching data item to expedite finding said matching data item for inspection.

9. An apparatus for controlling transfer of at least one data item from a data cache component communicatively coupled with storage using a first path and a second path, wherein the first path has a higher-latency than the second, the apparatus comprising a processor and a memory storing instructions that, when executed by the processor, cause the apparatus to perform operations comprising:
receive search terms from at least one of a current search or a prior search, the search terms indicative of diagnostics topics that were searched in a telecommunications network, the search terms usable to identify data items stored in the data cache component that are associated with the diagnostics topics;
respond to receiving the search terms by identifying a matching data item based on a match between the search terms and one of the data items stored in the data cache component; and
in response to identifying the matching data item, pass the selected one of said plurality of send the matching data item from the data cache component to the storage using the second path.

10. The apparatus as claimed in claim 9, further comprising instructions that, when executed by the processor, cause the apparatus to perform operations comprising make a duplicate of said matching data item while leaving an original of said matching data item in said data cache component.

11. The apparatus as claimed in claim 9, further comprising instructions that, when executed by the processor, cause the apparatus to perform operations comprising send the matching data item to permanent storage.

12. The apparatus as claimed in claim 9, further comprising instructions that, when executed by the processor, cause the apparatus to perform operations comprising send the matching data item to at least one of inspectable permanent storage, an inspectable portion of said cache, a low-bandwidth communications channel, or a post-cache processor.

13. The apparatus as claimed in claim 9, further comprising instructions that, when executed by the processor, cause the apparatus to perform operations comprising send at least one unselected data item of the data items to inspectable storage using the first path.

14. The apparatus as claimed in claim 9, further comprising instructions that, when executed by the processor, cause the apparatus to perform operations comprising send the matching data item to a further data cache component having a higher flush speed than a data cache component used for at least one unselected data item of the data items.

15. The apparatus as claimed in claim 9, wherein the data items are divided into a plurality of streams, further comprising instructions that, when executed by the processor, cause the apparatus to perform operations comprising:
identify a stream of the plurality of streams; and
send a plurality of data items from the identified stream.

16. The apparatus as claimed in claim 9, further comprising instructions that, when executed by the processor, cause the apparatus to perform operations comprising tag said matching data item to expedite finding said matching data item for inspection.

17. A computer program comprising computer-readable code that, when loaded into a computer system and executed thereon, cause said computer system to perform operations comprising:
receiving search terms from at least one of a current search or a prior search, the search terms indicative of diagnostics topics that were searched in a telecommunications network, the search terms usable to identify data items stored in a data cache component that are associated with the diagnostics topics, the data cache component communicatively coupled to storage via a first path and a second path, wherein the first path has a higher latency than the second path;
responsive to receiving the search terms, identifying a matching data item based on a match between the search terms and one of the plurality of data items stored in the data cache component; and
in response to identifying the matching data item, sending the matching data item from the data cache component to a storage using the second path.

* * * * *